UNITED STATES PATENT OFFICE.

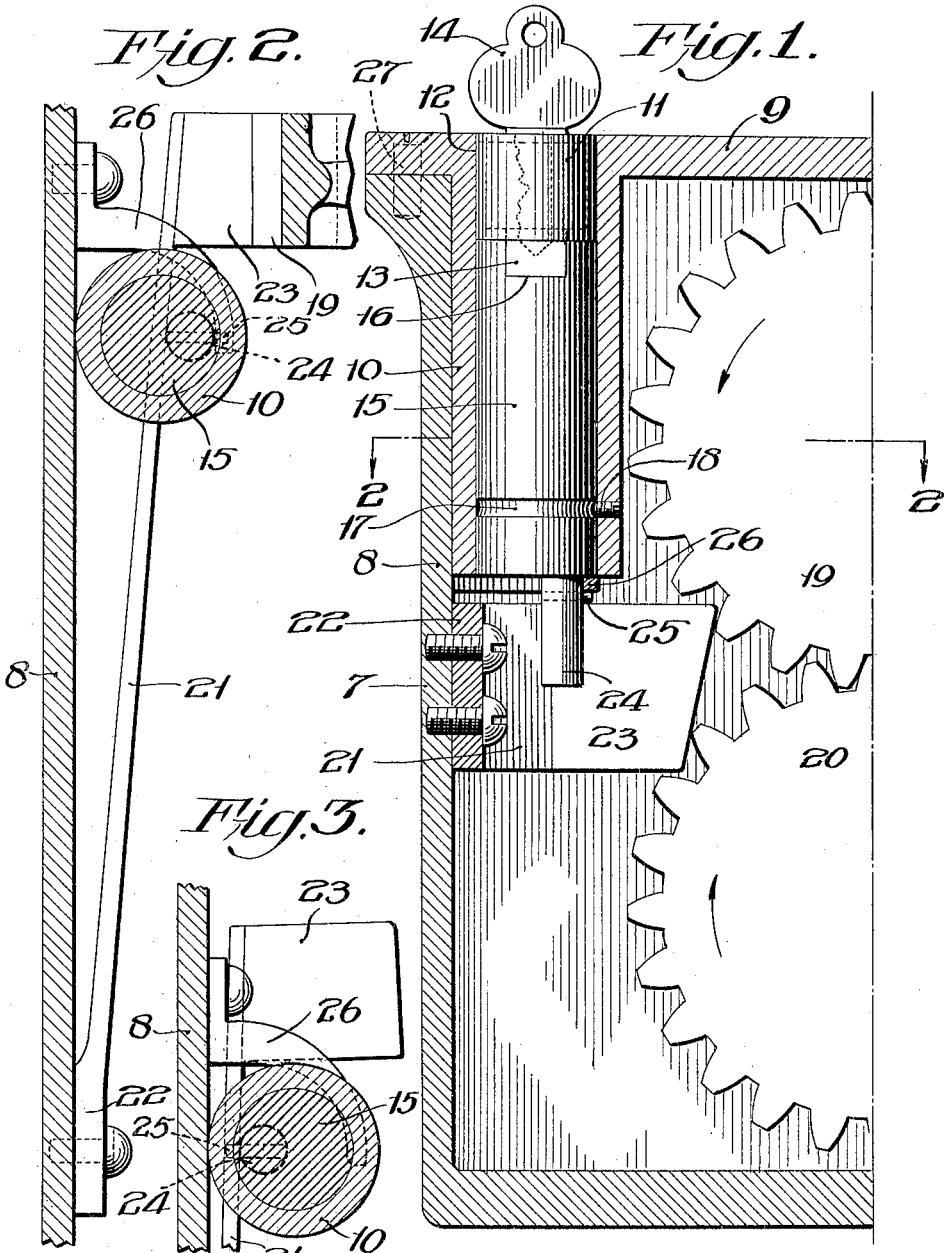

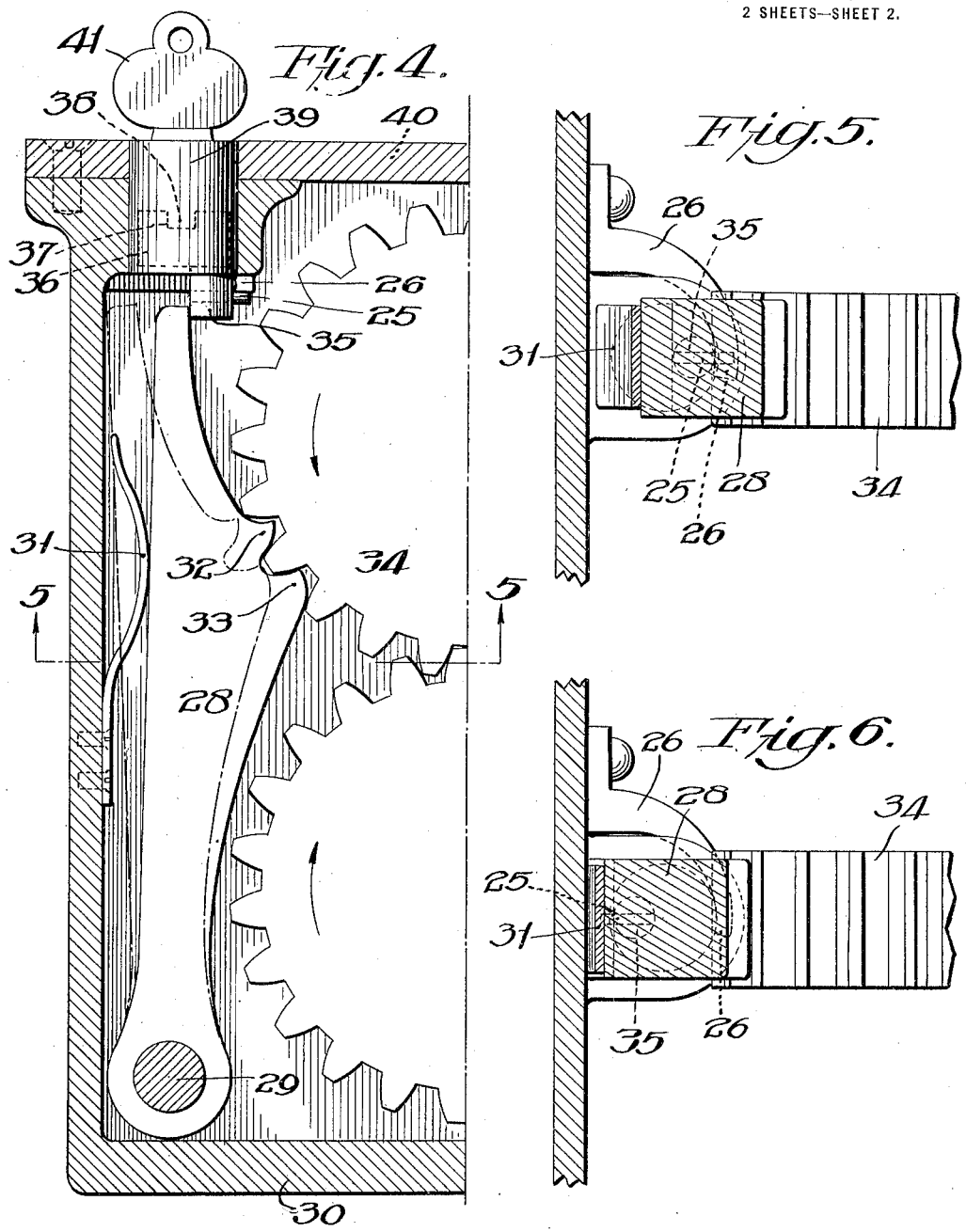

JESSEE MERCER WHITE, OF PHILADELPHIA, PENNSYLVANIA.

LOCKING DEVICE.

1,393,867.  Specification of Letters Patent.  Patented Oct. 18, 1921.

Application filed October 9, 1919. Serial No. 329,433.

*To all whom it may concern:*

Be it known that I, JESSEE M. WHITE, a citizen of the United States, residing at Philadelphia, in the county of Philadelphia and State of Pennsylvania, have invented certain new and useful Improvements in Locking Devices, of which the following is a specification.

One object of my invention is to provide means which will directly lock a transmission gear of an automobile so that it cannot be operated by an unauthorized person to move the automobile forwardly and my invention is thus well adapted to prevent the theft of automobiles.

Another object is to so construct the device of my invention that it will act in such manner that even if the engine is started the same cannot operate the transmission gear in a forward direction, but the transmission gear can be moved in an opposite direction so as to permit an automobile to be pushed backwardly in case it is desired to move the automobile a short distance, such as might be necessary in case of fire in a building or the like in front of which the automobile is standing.

A further object is to make the device of my invention of a simple construction and so that it cannot be unlocked unless a person has the proper key.

A still further object is to so arrange my invention in connection with the casing of a transmission gear that it is practically impossible for a person to gain access to the interior of the transmission casing for the purpose of moving the locking mechanism out of locking arrangement with the transmission gear.

These objects, and other advantageous ends which will be described hereinafter, I attain in the following manner, reference being had to the accompanying drawings in which Figure 1 is a fragmentary sectional elevation showing my invention attached to a transmission gear casing and operative to directly lock two of the transmission gears, Fig. 2 is a transverse section taken on the line 2—2 of Fig. 1, Fig. 3 is a fragmentary section also taken on the line 2—2 of Fig. 1 and showing the locking means having been moved into an inoperative position, Fig. 4 is a fragmentary sectional elevation showing a modified form of my invention applied to a transmission gear casing and illustrating in full lines the position of the locking means in operative position to lock one of the transmission gears and illustrating in dot-and-dash lines the position of the locking means having been moved into an inoperative position, Fig. 5 is a transverse section taken on the line 5—5 of Fig. 4 showing the locking means in engagement with said transmission gear and corresponding to the full line position of said locking means, and Fig. 6 is a fragmentary section taken on the line 5—5 of Fig. 4, showing the locking means having been moved into an inoperative position and corresponding to the dot-and-dash line position of Fig. 4.

Referring to Figs. 1 to 3 inclusive of the drawings, 7 is a transmission gear casing which is made up of a hollow body portion 8 and a cover 9. The cover 9 has a sleeve 10 depending therefrom into the body portion 8 and a lock 11 is forced or otherwise secured within a hole 12 in the cover 9, said hole communicating with the bore of the sleeve 10. The lock 11 may be of any well known type, preferably of the pin cylinder type which has a tenon or projection 13 which is rotatable when a key 14 is placed within the lock and turned. A cylinder 15 is rotatably mounted within the sleeve 10 and has a recess 16 into which the tenon 13 of the lock 11 fits so that when the tenon is rotated, the cylinder 15 will be rotated. The cylinder 15 may be held against longitudinal movement by any suitable means, and as illustrated, the cylinder 15 has an annular groove 17 into which projects the end of a screw or pin 18 which is mounted within the sleeve 10.

Two transmission gears 19 and 20 are illustrated as being mounted in the casing 7 and a spring arm 21 has one end secured to the side of the casing 7 as shown at 22, while the other end is provided with a wedge or detent 23. The cylinder 15 has a pin 24 depending from its lower end and is positioned entirely at one side of the axis of said cylinder. In other words, the pin 24 is eccentric to the axis of the cylinder 15. The resiliency of the arm 21 is such that it normally holds the detent 23 in mesh with the transmission gears 19 and 20, as clearly shown in Figs. 1 and 2. Thus the detent serves as a wedge that prevents the transmission gears from rotating in the direction of the arrows illustrated in Fig. 1 and this direction is the direction of movement of the transmission gears when the latter are actuated to propel an automobile in a forward direction. However, it is possible for the transmission gears to move in a reverse direction since in said latter direction, the teeth of the gears will tend to push the detent 23 out of their paths.

The arm 21 is so positioned with respect to the pin 24 that when the key 14 is turned to rotate the cylinder 15, the pin 24 will move the arm 21 to withdraw the wedge 23 from between the transmission gears 19 and 20. In other words, the pin 24 will move from the position shown in Fig. 2 to the position shown in Fig. 3. However, when the key 14 is again turned to move the pin 24 from the position shown in Fig. 3 to the position shown in Fig. 2, the arm 21 will move, due to its own resiliency, so as to move the wedge 23 again into locking position with the transmission gears 19 and 20.

As illustrated, when the pin 24 is moved to permit the wedge 23 to lock the gears, the cover 9 will be locked to the body portion 8. The means for thus locking the cover 9 to the body portion 8, as clearly shown in Fig. 1, consists of a lateral projection 25 which is adapted to engage under a lug 26 formed integral with the body portion 8 of the casing 7. Therefore, since the cylinder 15 is locked against longitudinal movement relatively to the cover 9, due to the fact that the screw or pin 18 projects within the groove 17, it will be impossible to lift the cover 9 from the body portion 8. If desired, however, for the purpose of securing a tight fit between the cover 9 and the body portion 8 the same may be screwed thereon, such for example as by screws 27.

In the form of my invention shown in Figs. 4 to 6 inclusive, I have shown a detent 28 in the form of a lever which is pivoted at 29 to the transmission casing 30. This lever is backed by a spring 31 adapted to push two toothed portions 32 and 33 of said lever into mesh with the teeth of the transmission gear 34. The lever 28 is adapted to be moved out of locking engagement with the gear 34 by means of a pin 35 connected to a cylinder 36, said cylinder having a recess 37 into which the tenon 38 of a lock 39 projects; said lock being secured to the top covering 40 of the casing 30. The pin 35 is arranged eccentrically to the axis of the cylinder 36 and is adapted, when the key 41 is turned, to move the lever 28 against the action of the spring 31 to free the transmission gear 34. In all other respects, the construction is substantially the same as that described in connection with Figs. 1 to 3 inclusive and I have therefore given corresponding parts similar reference numerals.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In a device of the character described, the combination of spring-operative means movable due to its resiliency into direct locking engagement with a gear and a lock operative by selective means and having a rotatable portion including an eccentric part adapted, when said rotatable portion is actuated, to freely bear upon a side of and move said first means to flex it and place it under tension to withdraw it from locking engagement with said gear; substantially as described.

2. The combination of a transmission gear for power driven vehicles; a gear casing inclosing said gear; locking means having a spring portion for moving it in the direction of the plane of rotatable movement of said gear into direct locking engagement with said gear, said locking means being secured within said transmission gear casing; a lock secured to said casing; means connected to a movable portion of said lock and adapted to move said locking means out of locking engagement with said gear against the movement of said spring portion; and selective means for moving said portion of the lock; substantially as described.

3. The combination of a transmission gear for power driven vehicles; a gear casing inclosing said gear; locking means having a spring portion for moving it in the direction of the plane of rotatable movement of said gear into direct locking engagement with said gear, said locking means being secured within said transmission gear casing; a lock secured to said casing; a cylinder connected to a movable portion of said lock and having an eccentric pin thereon adapted to move said locking means out of engagement with said gear and against the action of said spring portion; and selective means for moving said portion of the lock; substantially as described.

4. The combination of a transmission gear for power driven vehicles; a gear casing inclosing said gear and having a body portion and a cover; locking means; automatically operative means for moving and normally holding the locking means in locking engagement with said gear, said locking means being secured within the transmission casing; a lock secured to said cover of the casing, said body portion having a part concealed from the outer portion of the casing; and means connected to a movable portion of said lock and adapted to move from its normal position to actuate said locking means to move the latter out of locking engagement with said gear against the movement of said automatic means, said lock connected means having a portion adapted to be moved into engagement with said part of the body portion of the casing when the lock connected means is moved into its normal position, to permit the automatic means to effect the locking of the gear, to cause the locking of said cover to the body portion of the casing; substantially as described.

In testimony whereof I have signed my name to this specification in the presence of two subscribing witnesses.

JESSEE MERCER WHITE.

Witnesses:
HARRY KLINGLER,
ANTRIM V. ERRICKSON.